(12) United States Patent
Borras et al.

(10) Patent No.: US 10,708,411 B2
(45) Date of Patent: Jul. 7, 2020

(54) GNSS PHONE-BASED AUTOMATED EMERGENCY ASSISTANCE CALLING FOR VEHICULAR APPLICATIONS

(71) Applicant: GEOTOLL, INC., Cooper City, FL (US)

(72) Inventors: Jaime Andres Borras, Miramar, FL (US); Wyatt Drake Geist, Davie, FL (US); James Edward Borras, Miami Lakes, FL (US)

(73) Assignee: GEOTOLL, INC., Cooper City, FL (US)

( * ) Notice: Subject to any disclaimer, the term of this patent is extended or adjusted under 35 U.S.C. 154(b) by 0 days.

(21) Appl. No.: 16/394,129

(22) Filed: Apr. 25, 2019

(65) Prior Publication Data
US 2019/0335035 A1 Oct. 31, 2019

Related U.S. Application Data

(60) Provisional application No. 62/662,509, filed on Apr. 25, 2018.

(51) Int. Cl.
*H04M 11/04* (2006.01)
*H04M 1/725* (2006.01)
(Continued)

(52) U.S. Cl.
CPC ..... *H04M 1/72538* (2013.01); *H04M 1/6075* (2013.01); *H04M 1/72569* (2013.01); *H04M 1/72572* (2013.01); *H04W 4/021* (2013.01); *H04W 4/029* (2018.02); *H04W 4/90* (2018.02); *B60R 21/0132* (2013.01); *H04M 2242/14* (2013.01); *H04M 2250/12* (2013.01); *H04M 2250/74* (2013.01)

(58) Field of Classification Search
CPC combination set(s) only.
See application file for complete search history.

(56) References Cited

U.S. PATENT DOCUMENTS

2009/0002145 A1\* 1/2009 Berry ................ G08G 1/205
340/436
2016/0182707 A1\* 6/2016 Gabel ................ H04W 4/90
455/404.2

(Continued)

*Primary Examiner* — Justin Y Lee
(74) *Attorney, Agent, or Firm* — The Concept Law Group, PA; Scott M. Garrett; Scott D. Smiley

(57) ABSTRACT

A phone device monitors an accelerometer while traveling in a vehicle to detect unusually large excursions or sudden changes in acceleration magnitude. When such an excursion is detected, the phone device then compares the excursion with the output of other components in the vehicle that can confirm or dispel a finding that the vehicle has experienced a collision. Once a likely collision has been detected, the phone device goes into an automated assistance mode where the use can be voice prompted as to their condition. If no response is received, the phone device can automatically call emergency services for assistance, providing the present location of the phone device. In less severe incidents, the phone device can automatically offer immediate access to other services, include a towing service, an attorney, an automobile service, among others. The service providers are based on a geo-fenced region in which the phone device is located.

17 Claims, 8 Drawing Sheets

(51) Int. Cl.
*H04M 1/60* (2006.01)
*H04W 4/029* (2018.01)
*H04W 4/021* (2018.01)
*H04W 4/90* (2018.01)
*B60R 21/0132* (2006.01)

(56) References Cited

U.S. PATENT DOCUMENTS

2017/0265102 A1* 9/2017 Yang .................... B60R 21/013
2018/0061151 A1* 3/2018 Chainer ............... G07C 5/0841

* cited by examiner

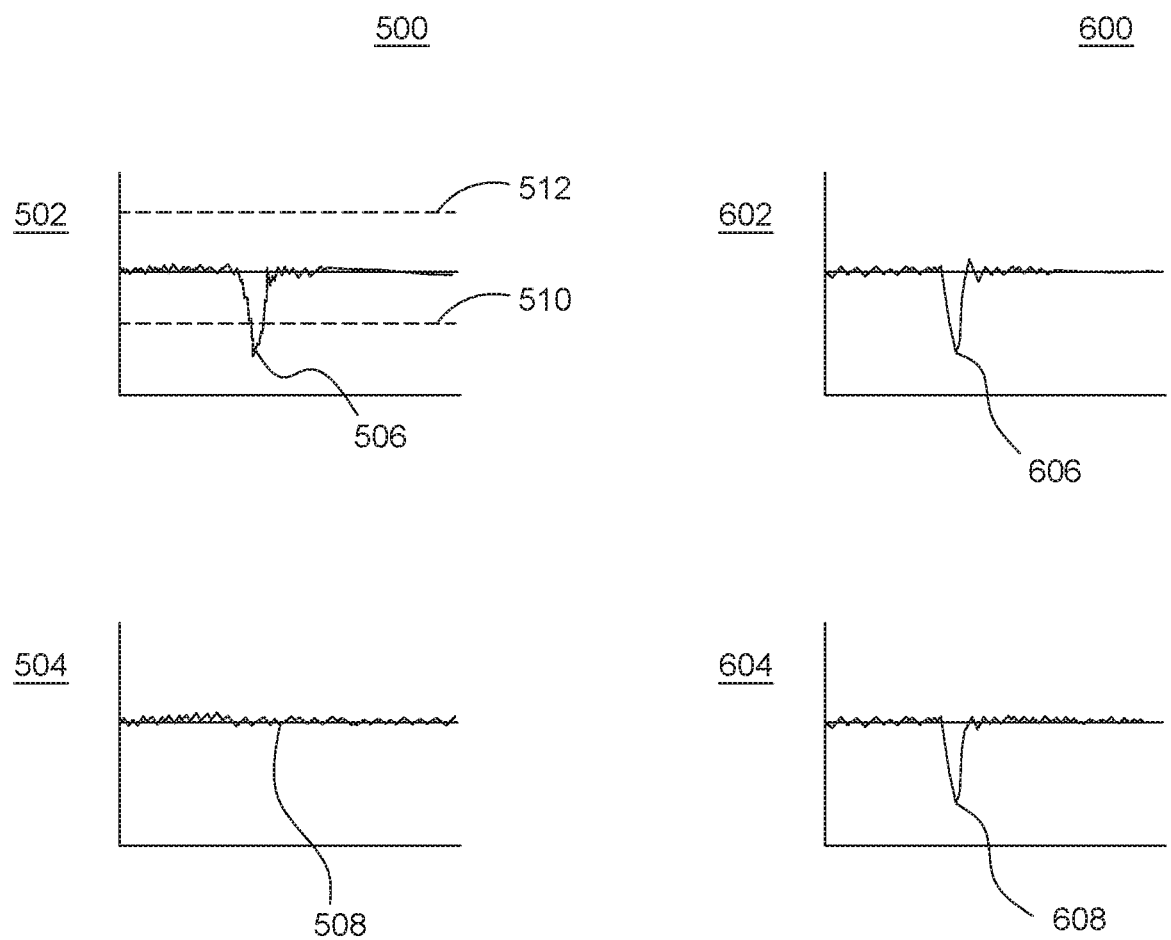

GNSS PHONE-BASED AUTOMATED EMERGENCY ASSISTANCE CALLING FOR VEHICULAR APPLICATIONS

CROSS REFERENCE

This application is a conversion of, and claims the benefit of provisional application No. 62/662,509, filed Apr. 25, 2018, the entirety of which is hereby incorporated by reference.

FIELD OF THE DISCLOSURE

The present disclosure relates generally to automated systems that assist motor vehicle operators upon occurrence of a collision or similar incident, and more particularly relates to detecting the occurrence of a collision in a mobile device transported inside the vehicle, and, based on the nature of the collision, identifying specific related services based on the location of the incident and presenting the options to the user.

BACKGROUND

There are currently some services available to motorists that can assist motorists in the event of a collision or similar event. For example, General Motors offers the On-Star™ service that can connect a vehicle operator to the On-Star™ service in the event of an air bag deployment or other vehicle indication of a collision or accident. These services are typically subscription services for which the vehicle operator pays a monthly fee, and they are limited to a particular vehicle. Obviously, then, people in vehicles that do not include the communication equipment to support these services are unable to utilize those services in the event of a collision. Furthermore, in the event of an incident, a driver or vehicle passenger may desire to have ready access to other services that are not available through these subscriptions. Examples of other services can include a towing service, medical services, and so on.

Accordingly, there is a need for a method and apparatus for a system that assists a vehicle operator more comprehensively in the event of a collision incident.

BRIEF DESCRIPTION OF THE FIGURES

In the accompanying figures like reference numerals refer to identical or functionally similar elements throughout the separate views, together with the detailed description below, and are incorporated in and form part of the specification to further illustrate embodiments of concepts that include the claimed invention and explain various principles and advantages of those embodiments.

FIG. 5 is an event comparison showing an acceleration event detected by a phone that is not confirmed by an external acceleration sensor, in accordance with some embodiments;

FIG. 6 is an event comparison showing an acceleration event detected by a phone that is confirmed by an external acceleration sensor, in accordance with some embodiments;

Figure 1:
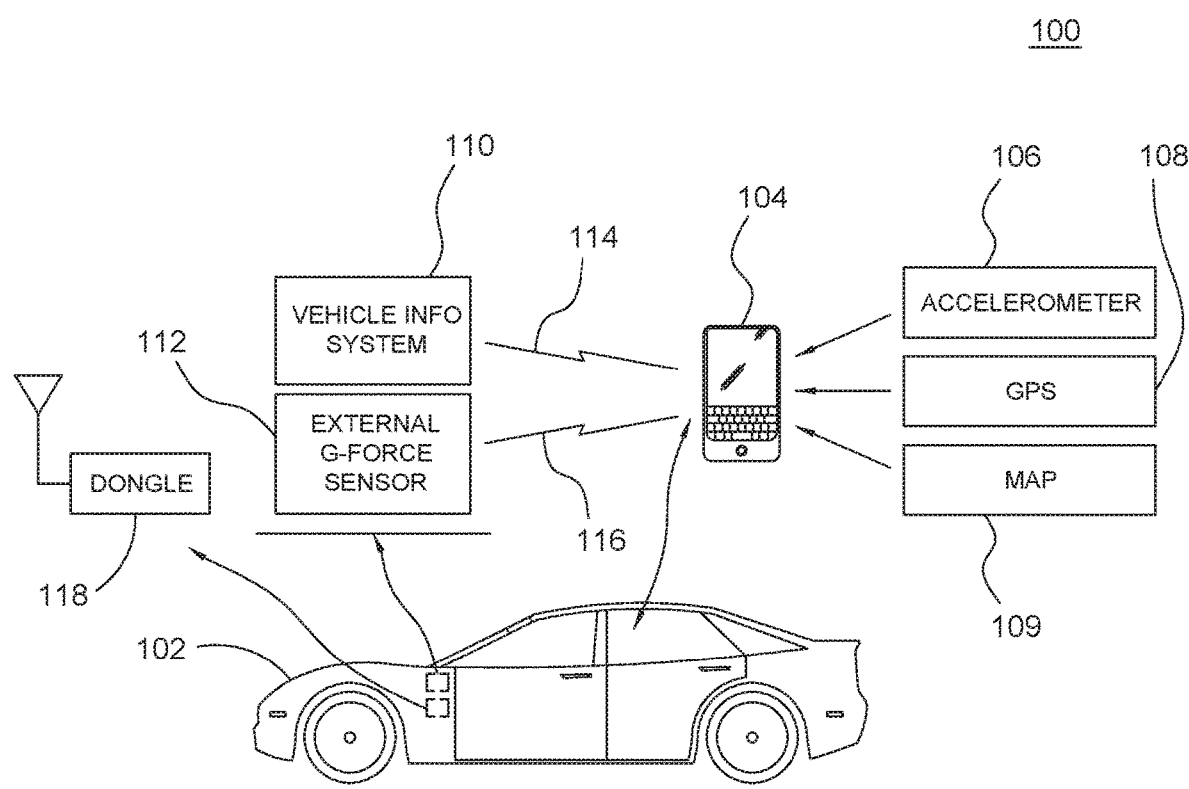
FIG. 1 is a vehicle system diagram including a phone device that detect a collision event, in accordance with some embodiments.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. The details of well-known elements, structure, or processes that would be necessary to practice the embodiments, and that would be well known to those of skill in the art, are not necessarily shown and should be assumed to be present unless otherwise indicated.

DETAILED DESCRIPTION

The inventive embodiments of the disclosure include a method, and a system that performs the method, for detecting and responding to a collision incident by a phone device. The method steps include monitoring an acceleration of a vehicle in which the phone device is located as indicated by an output of at least one accelerometer. The method further performs the step of detecting, in the output of the at least one accelerometer, an acceleration event indicative of a collision event being experienced by the vehicle. The method further performs the step of, responsive to the acceleration event, the phone device automatically issuing a voice prompt to elicit a response from a vehicle occupant. When no voice response is received within a preselected time frame, the phone device automatically calls an emergency services number and issues a pre-recorded message indicating a collision has occurred, and further issues location information to an emergency services call center with severity of the accident. When a voice response is received, the phone device performs an action corresponding to the voice response. The phone device also displays a menu of additional optional actions that can be taken, wherein at least one of the additional options is based on a location of the collision event.

FIG. 1 is a vehicle system 100 including a phone device 104 that detects an occurrence of a collision event, in accordance with some embodiments. The phone device 104 can be a smart phone device including an operating system that can support and run application programs, as is known. It is common for such devices to include an array of component systems for use by application programs, including, for example, accelerometers, magnetometers (electronic compass), local and personal area networking transceivers (e.g. WiFi, BLUETOOTH), and a satellite location receiver (e.g. GPS), to name a few. These components can operate simultaneously and independently, providing data to a controller running an application program as needed.

The phone device 104 can be operated by a person such as the driver/operator or other occupant of the vehicle 102, and it can include an accelerometer 106 and a satellite location receiver 108 such as a Global Navigation Satellite System (GNSS) receiver which can monitor multiple satellite constellations such as Global Positioning System (GPS) form U.S., Galileo from European, GLONASS from Russia, BeiDou from China, etc.; and a mapping program 109 that allows the phone device to determine a road location of the phone device 104/vehicle 102 based on its geolocation coordinates as indicates by the satellite location receiver. The accelerometer 106 can be, for example, a three axis micro-electromechanical switch (MEMS) accelerometer that provides an output of acceleration in digital form for each of three orthogonal axes. Alternatively, or additionally, the phone device 104 can be communicatively linked to an external acceleration sensor 112 that can be located in the vehicle 102. The communication link 116 can be, for example, a local wireless (radio) link 116 using an established wireless networking protocol (e.g. WiFi, BlueTooth, Zigbee, etc.). Similarly, the phone device 104 can be linked to the vehicle computer/instrumentation system 110 over a communication link 114, and can receive information such as, for example, indication of deployment of an air bag restraint, speed at time of collision, and so on. In some embodiments a dongle device 118 having a local or personal area networking transceiver can be attached to the vehicle diagnostic connector to interface with the vehicle's on board computer system. By being interfaced with the vehicle in this manner, the dongle can read information such as whether an air bag has been deployed. In some embodiments the dongle device can be programmed to read specific codes generated by the vehicle's system so that the dongle device can recognize particular codes that may be relevant to determining whether a collision has occurred. The external accelerometer sensor 112 can be incorporated into the dongle device 118, or it can be a separate device that is affixed to a location in the vehicle 102.

In the event of an actual collision, the phone device 104 and external sensor 112 may experience significantly different magnitudes of acceleration due to the phone device 104 being located on a person (e.g. in a pocket). The acceleration change experienced by the phone device 104 may therefore have a magnitude that is less indicative of a collision than the acceleration change experienced in the vehicle 102. Thus, the phone device 104 can, in some embodiments, compare the acceleration magnitudes indicated by both the internal acceleration sensor 106 and the external sensor 112 to determine and verify the occurrence of a collision event. Such a comparison can also allow the phone device 104 to avoid false collision sensing such as when the user of the phone device 104 drops the phone device 104 since the external sensor 112 will not indicate a corresponding change in acceleration. Alternatively, in some embodiments where an external sensor 112 is not present, the internal acceleration sensor 106 can be compared to the speed indicated by the GPS unit 108 before and after an apparent collision event, as indicated by a sudden and significant change in acceleration at internal acceleration sensor 106, to determine if there was a change in speed consistent with a collision event in order to avoid false collision detections.

Once a collision event has been detected, however, the phone device 104 launches a collision response application that allows the user to use the phone device 104 to access, for example, emergency services in the event of a severe collision, or a towing service. The phone device 104 can also be preprogrammed with insurance contact information to allow the user of the phone device 104 to easily contact their insurance carrier. In some embodiments, upon being activated, the collision response application can issue a voice prompt over a loudspeaker of the phone device 104, such as "do you need emergency assistance?" After issuing the voice prompt, the phone device can use voice recognition processing to recognize, or attempt to recognize, a voice response. The voice response can be a simple "yes" or "no" response from an occupant of the vehicle. In some embodiments, the voice prompt can be repeated one or more times while waiting for a response during a response waiting period. If a voice response is not received within a selected period of time then the phone device can automatically commence contacting (calling) an appropriate emergency services phone number (e.g. 911). This can also be performed in response to receiving an affirmative voice response (e.g. "yes"). However, if the phone device 104 receives a negative voice response, indicating emergency services are not needed/desired, then the phone device 104 can offer an opportunity to contact non-emergency services, such as a towing service, an auto club for motorist assistance (which can provide a towing service), insurance, legal, police, and other services. These can be offered as additional voice prompts or one a menu displayed on a graphical display screen of the phone device 104. If the user selects a service, then the phone device 104 can determine a particular service provider to call based on the location of the phone device, as indicated by the satellite location receiver 108 and map program 109.

Figure 2:
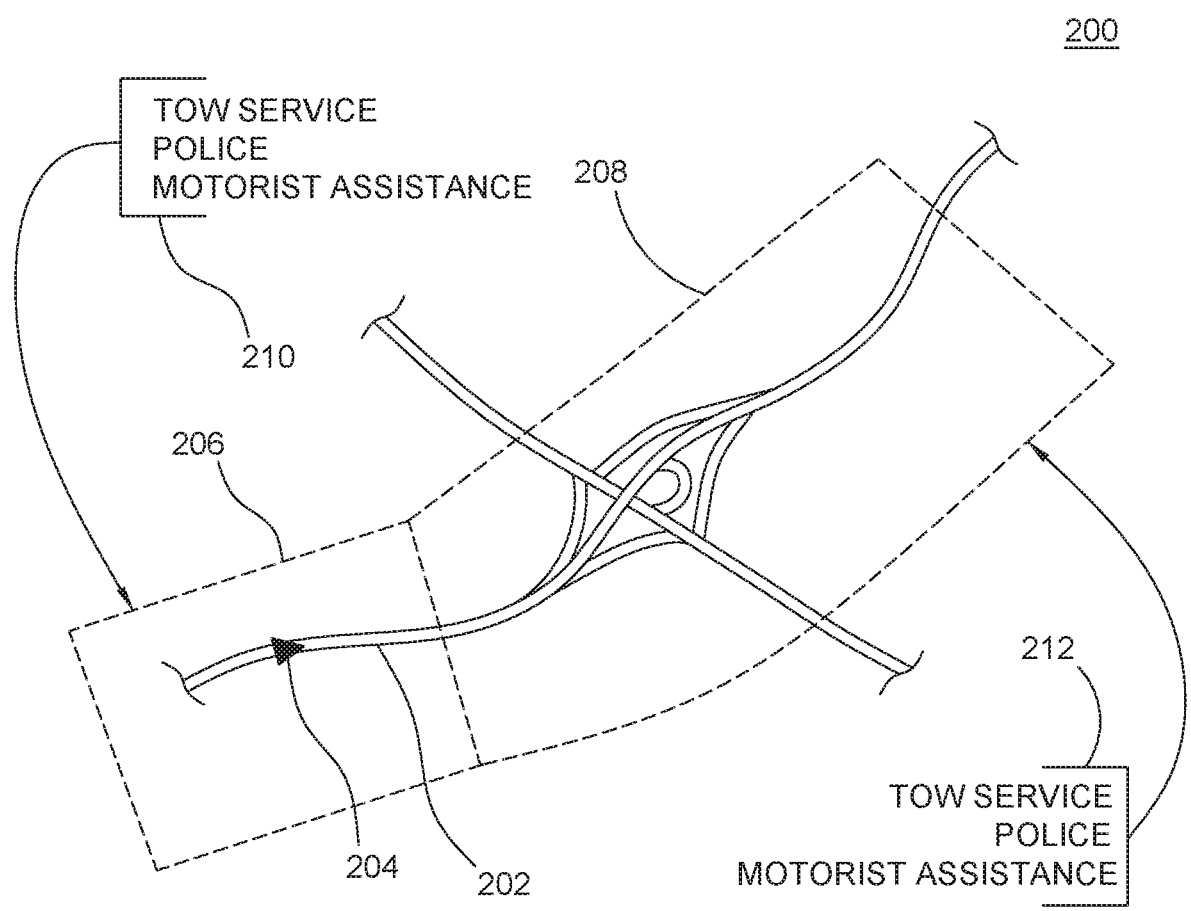
FIG. 2 is a mapping diagram that shows geo-fenced regions defining service providers for various services that may be necessary in the event of a collision in the geo-fenced region, in accordance with some embodiments.

FIG. 2 is a mapping diagram 200 that shows geo-fenced regions defining service providers for various services that may be necessary in the event of a collision in the geo-fenced region, in accordance with some embodiments. A mapping program can be operated by a phone device that can be used in conjunction with a collision detection and response program to track a vehicle's location, and determine a location at the time of a collision. The mapping program uses the phone device's position in geolocation coordinates (as indicated by a satellite location receiver) to determine its location on a map. The map can include roadways 202 on which a present position of a vehicle location 204 can be mapped. Furthermore, geo-fenced regions such as regions 206, 208 can be defined that associate service providers with the regions 206, 208 within the geo-fence, so that if a motorist has a collision, appropriate local service providers associated with the particular geo-fenced region in which the collision occurred can be contacted directly from the collision site using the phone device. This can be more efficient than, for example, contacting a motor club service to have them send a service provider that may not be familiar with the region.

Accordingly, as tracked on a map, a vehicle location 204 can be tracked on a roadway 202, shown here as an interstate highway but it could also be a local surface street. The vehicle can have a phone device such as phone device 104 of FIG. 1, and the vehicle can have systems that link to the phone device such as an external acceleration sensor. The region can be defined into geo-fenced regions such as regions 206, 208. Each region 206, 208 can have associated with it a listing of service providers 210, 212, respectively. In the event of a collision detection, after, or instead of contacting emergency services, the phone device can provide the user with a menu (voice and/or graphically) of other services that may be of use for the user, such as a towing service, local police for non-emergency needs, motorist assistance, collision repair shop, as well as the user's insurance company, a lawyer, and other information that can be of use. The service information associated with the various defined geo-fenced regions 206, 208 can be acquired by the phone device from a server over a cellular data communications network upon detecting the occurrence of a collision, based on the phone device/vehicle location 204. In some embodiments local service providers can buy or pay to be listed in the listings of service providers 210, 212.

Figure 3:
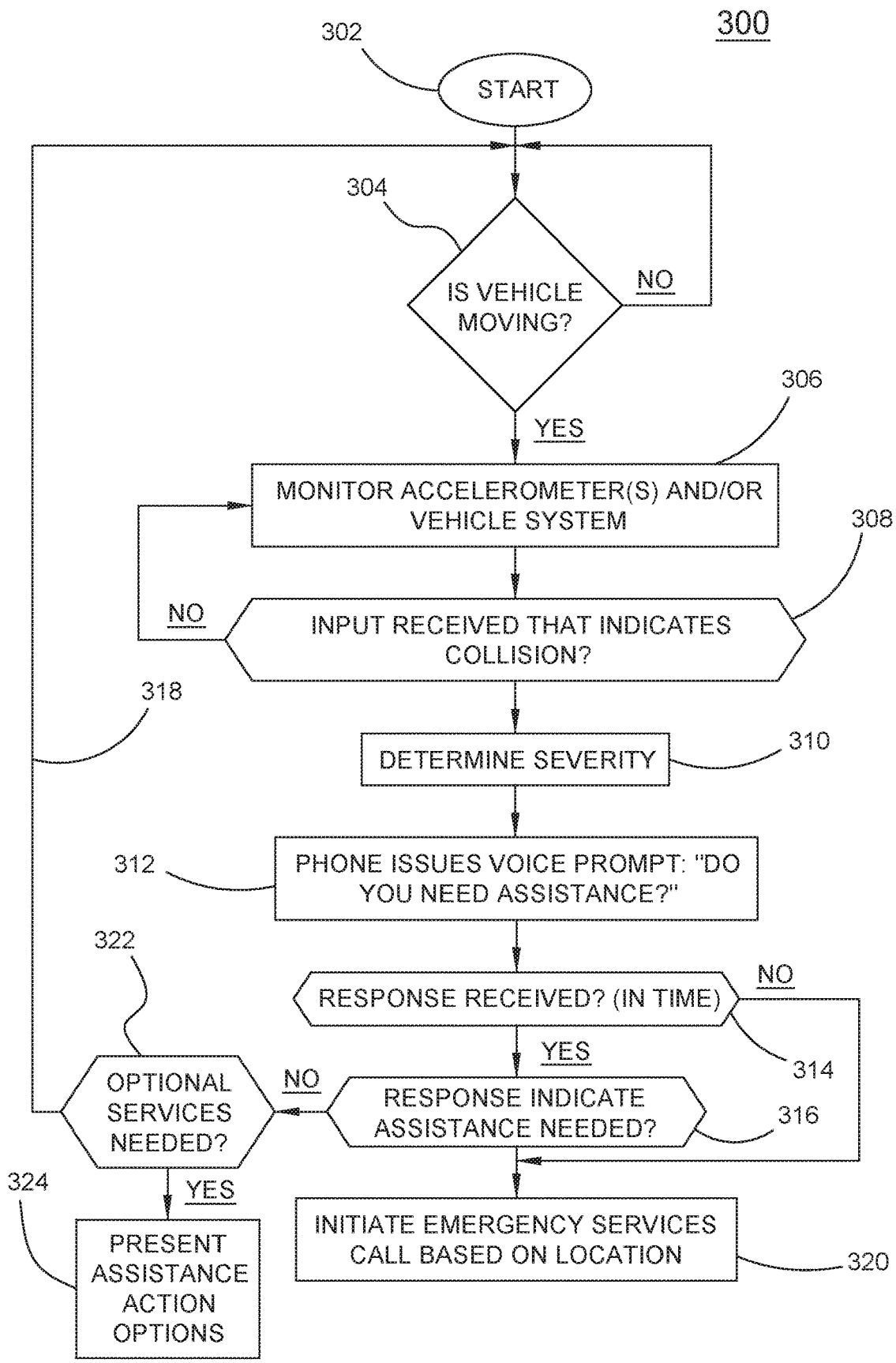
FIG. 3 is a flow chart diagram of a method for an application program being operated on a phone device to detect and respond to a collision incident, in accordance with some embodiments.

FIG. 3 is a flow chart diagram of a method 300 for an application program being operated on a phone device to detect and respond to a collision incident, in accordance with some embodiments. The method 300 is similar to the method and functionality performed by the phone device 104 of FIG. 1. At the start 302, the phone device is on and running a collision detection application program that monitors one or more acceleration sensors (internally and/or externally) to determine if a collision or similar incident has occurred. As an initial process, the phone device can connect to an external acceleration sensor using, for example, a local or personal area networking transceiver and a suitable communication protocol. The phone device can compare the acceleration magnitude of both the internal and external acceleration sensors to verify the occurrence of a collision event. If there is no external acceleration sensor, the phone device can use other ways to determine whether a collision has occurred, such as detecting an abrupt change of speed of the vehicle at the same time as the acceleration change. In some embodiments, collision detection may be performed only when the vehicle is moving, as indicated in step 304. However, in some embodiments, collision monitoring can be performed without regard to speed (i.e. when a vehicle is hit when sitting still such as being "rear ended").

In step 306 the output magnitude value of the one or more acceleration sensors is monitored by the phone device and collision detection application program. In step 308, the collision detection program can determine that the output of one or more acceleration sensors indicates a collision has occurred. Initially, only the internal acceleration sensor needs to be monitored. If the output of the internal acceleration sensor indicates the occurrence of a sudden acceleration event (i.e. change), then a confirmation process can be performed. That is, the phone device determines whether the phone device has experienced an acceleration greater than a preselected acceleration threshold, and if so, then a confirmation process is undertaken. In some embodiments the confirmation process can include comparing the performed by comparing the output of several acceleration sensors to eliminate false collision detections such as if the user drops the phone device. The phone device can also use audio received at the microphone of the phone device to detect and verify collisions. Alternatively, the collision detection can be set to occur at even modest acceleration levels, and prompting the user can account for avoiding false collision detections. In general, the confirmation process examines an external source, such as an external accelerometer, satellite position signals received at the satellite positioning system receiver, the vehicle system, ambient audio sounds, and so on, in trying to confirm that a collision occurred.

In step 310 the severity of the collision can be determined based on, for example, the magnitude of the detected acceleration(s), whether an airbag has deployed, or other changes in the vehicle that can be ascertained through the vehicle computer. The acceleration events corresponding to likely collisions can be categorized into several categories, from minor to extreme collision likelihood. How the method 300 proceeds can be dictated by the indicated severity of the detected collision. In response to detecting the collision, in step 312 the phone device can automatically issue a voice prompt, such as "do you need assistance?" over a loudspeaker of the phone device. For a more severe collision, the phone device can instead prompt the user with, for example, "are you hurt?" Thus, the determined severity of the collision can determine how the phone device prompts the user.

Furthermore, in steps 308-310, it is contemplated that the vehicle can be a connected vehicle that has its own communication system, and is configured to detect and respond to at least some forms of collisions. However, it is recognized that such a vehicle could be damaged to the extent that it is unable to determine the collision, or unable to communicate and report the collision. In such cases, then, the phone device can communicate with the vehicle system, or attempt to communicate with the vehicle system, and determine that the vehicle is damaged to the point of being unable to perform its collision reporting. In response, the phone device can be configured to automatically call a pre-programmed reporting number or connect to a URL using data communications, and report the occurrence of the collision and an indication of the severity of the collision. The report can prompt predisposed response in which emergency services are dispatched by the entity receiving the collision report information.

Upon prompting the user, the phone device can listen for an audible response in step 314. The phone device can then processed received audio signals output by the phone device's microphone using a speech recognition program module to recognize spoken words that may be spoken by a user in response to the voice prompt. The phone device, executing the collision detection program, can recognize spoken responses such as "yes" or "no," or other responses such as "call help", including recognizing the voice cadence compared to the user's regular voice to additionally access the occupant's condition. After issuing the voice prompt, then in step 314 the phone device attempts to recognize a spoken response within a time limit. When a spoken response is recognized, in step 316, the phone device can take appropriate further steps. For example, if the collision detection was a false detection, or not a collision, then the user can respond "no," and the method can return to step 304 or 306. If in step 316 the user indicates assistance is needed, or when no response is received in step 314, the method 300 can proceed to step 320 to initiate contacting the appropriate services based on the severity of the collision. For example, the phone device can be configured to automatically call an emergency services number (e.g. 911) and, upon the call being answered, play a pre-recorded message indicating that a possible collision has occurred, the vehicle occupants may be incapacitated, and then a location of the phone device can be indicated. In some embodiments the location information can be transmitted as coordinate data. In some embodiments the phone device can indicate the name of a nearest road and cross road, as well as a direction and distance from the intersection of roads. In some embodiments, where the user is able to speak and respond, the call can connect the user to the emergency services operator as a conventional voice call. In some embodiments, when the user is able to speak, the user can be connected to emergency responders (e.g. an ambulance or fire/rescue, or police). This may assist in locating the vehicle as the user can indicate whether, for example, they can hear sirens approaching, which can help responders find a vehicle that may have gone off the roadway into brush, or down an embankment that might otherwise obscure sight of the vehicle.

Furthermore, the user can be offered a menu of additional services or assistance actions that may be required which the phone device can automatically contact and allow the user to arrange for the other services (e.g. tow service or other motorist assistance, insurance company, etc.). For example, step 316 can determine whether urgent services are needed, and if not, then in step 322 the phone device can determine whether the user would like other services and, in step 324, display a menu of assistance actions such as "CALL A TOWING SERVICE" or "CALL INSURANCE." Various services displayed can be associated with service providers of the geo-fenced region in which the vehicle is located.

Figure 4:
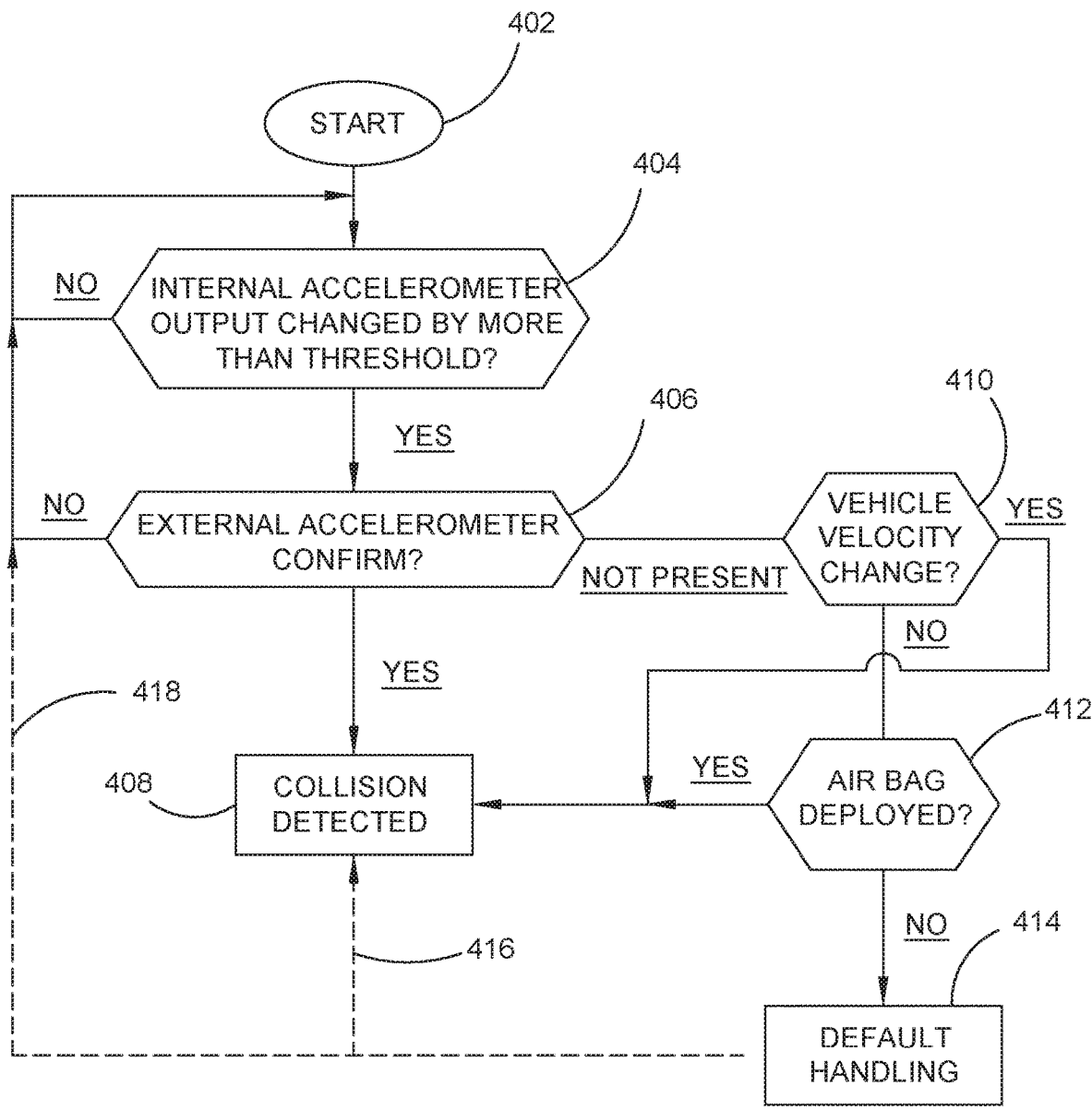
FIG. 4 shows a flow chart diagram of a method or process for detecting a collision at a phone device traveling in a vehicle, in accordance with some embodiments.

FIG. 4 shows a flow chart diagram of a method or process 400 for detecting a collision at a phone device traveling in a vehicle, in accordance with some embodiments. The method 400 can be performed, for example in steps 306, 308 of method 300 of FIG. 3. Therefore, at the start 402, the phone device is on and operating, in the process of carrying out a method substantially similar to that of method 300 of FIG. 3. In step 404 the internal accelerometer of the phone device is monitored for sudden changes consistent with an impact. A threshold excursion magnitude can be selected (e.g. 2 g—twice that of gravity). The magnitude can be found as the square of the acceleration in each of the three axes being summed, and then the square root of the sum of the squares is calculated to obtain an acceleration magnitude. Since the phone device can be in an arbitrary orientation at the moment of a collision, only the magnitude of the total acceleration vector need be used. Until the acceleration magnitude exceeds the selected threshold, step 404 is essentially looped or otherwise a waiting point.

When the acceleration magnitude, as indicated by the phone device's internal accelerometer, exceeds the selected threshold, then the method 400 proceeds to step 406 in which an external accelerometer output is checked. The external accelerometer is located in the vehicle, preferably attached to the vehicle or otherwise fixed in place in the vehicle, and is communicatively linked with the phone device via a local or personal area networking protocol. The external accelerometer can be configured to transmit an alert if it experiences an acceleration magnitude greater than a preselected threshold, and the time of the transmission can be used to correlate the event with the time of the event indicated by the internal accelerometer. In some embodiments the external accelerometer can be configured to maintain a recent history of acceleration that can be queried by the phone device via the network link. Other configurations will occur to those skilled in the art which operate equivalently.

There are three options at step 406; either the external accelerometer did not experience a corresponding acceleration event, it did experience a corresponding acceleration event, or there is no external accelerometer. When the external accelerometer is present, but does not indicate that is experienced a similar acceleration event at the same time as that experienced by the phone device, then the method returns to step 404. In this case it is likely that the phone device was dropped. When the external accelerometer indicates that it did experience a corresponding acceleration event, then the method proceeds to step 408 where it is decided that a collision has likely occurred. From step 408, then, the method can proceed to step 310 of method 300 in FIG. 3.

In the case where there is no external accelerometer, then after step 404 where an acceleration event was detected by the internal accelerometer, the method can perform alternative processing by proceeding to step 410 where one or more alternative processes for confirming whether a collision occurred can be performed. For example, in step 410 the phone device can compare speed in the change of geo-location position before and after the acceleration event, as indicated by a satellite positioning receiver. That is, a first speed or speed value determined before the acceleration event can be compared to a second speed after the acceleration event and if the difference indicates that there has been a sufficiently abrupt decrease in speed, then it is likely a collision has occurred and the method commences to step 408 for further processing. However, if a sufficient speed change cannot be determined, which can happen if, for example, a collision occurred while the vehicle was stationary, then a different process can be used such as that indicated in step 412 where the phone device can query the vehicle computer (e.g. using a networked dongle). For example, if the vehicle indicates that an air bag has been deployed, then that would be sufficient to indicate that a collision has occurred and the method can proceed to step 408 for further processing. If no other confirmation can be found in other steps 410, 412, then a default process can be performed in step 414. In the default process, the user can select how to handle detection of an acceleration event, that can't be corroborated by other means. For example, the user can configure the phone device to prompt the user, and depending on the response (or no response) the method can proceed to step 408, as indicated by line 416, or to step 404, as indicated by line 418. This process may also serve as a fail-safe algorithm for connected cars when its embedded response devices get damaged due to the accident.

FIG. 5 is an event comparison 500 showing an acceleration event detected by a phone that is not confirmed by an external acceleration sensor, in accordance with some embodiments. In this example the output 502 of an internal accelerometer of a phone device is compared with the output 504 of an external accelerometer located in a vehicle and which is in communication with the phone device. The horizontal axes represent time, increase from left to right, and the vertical axes represent magnitude of the output in all three dimensions. In the output 502 of the internal accelerometer, an acceleration excursion 506 is experienced at a given time. The excursion exceeds a threshold indicated by lines 510, 512. Here the magnitude can be positive or negative, but the absolute value of the magnitude could also be used equivalently.

In comparing the output 502 of the internal accelerometer with the output 504 of the external accelerometer, it can be seen, in this example, that there is no corresponding change in acceleration at time 508. Therefore the external accelerometer did not experience a corresponding change in acceleration, and it is unlikely that the vehicle was involved in a collision. In this case, then, in the method 400 of FIG. 4, the "no" branch out of step 406 would be followed.

FIG. 6 is an event comparison 600 showing an acceleration event detected by a phone that is confirmed by an external acceleration sensor, in accordance with some embodiments. As with FIG. 5, in this example the output 602 of an internal accelerometer of a phone device is compared with the output 604 of an external accelerometer located in a vehicle and which is in communication with the phone device. An excursion 606 indicated by the output 602 of the internal accelerometer corresponds to a similar excursion 608 at the output 604 of the external accelerometer. Accordingly, it can be determined that a collision likely occurred as both the phone device and vehicle experienced a substantial change in acceleration at the same time. In such cases, then, in FIG. 4, the method 400 would proceed from step 404 to step 406, and then to step 408.

Figures 7, 8:
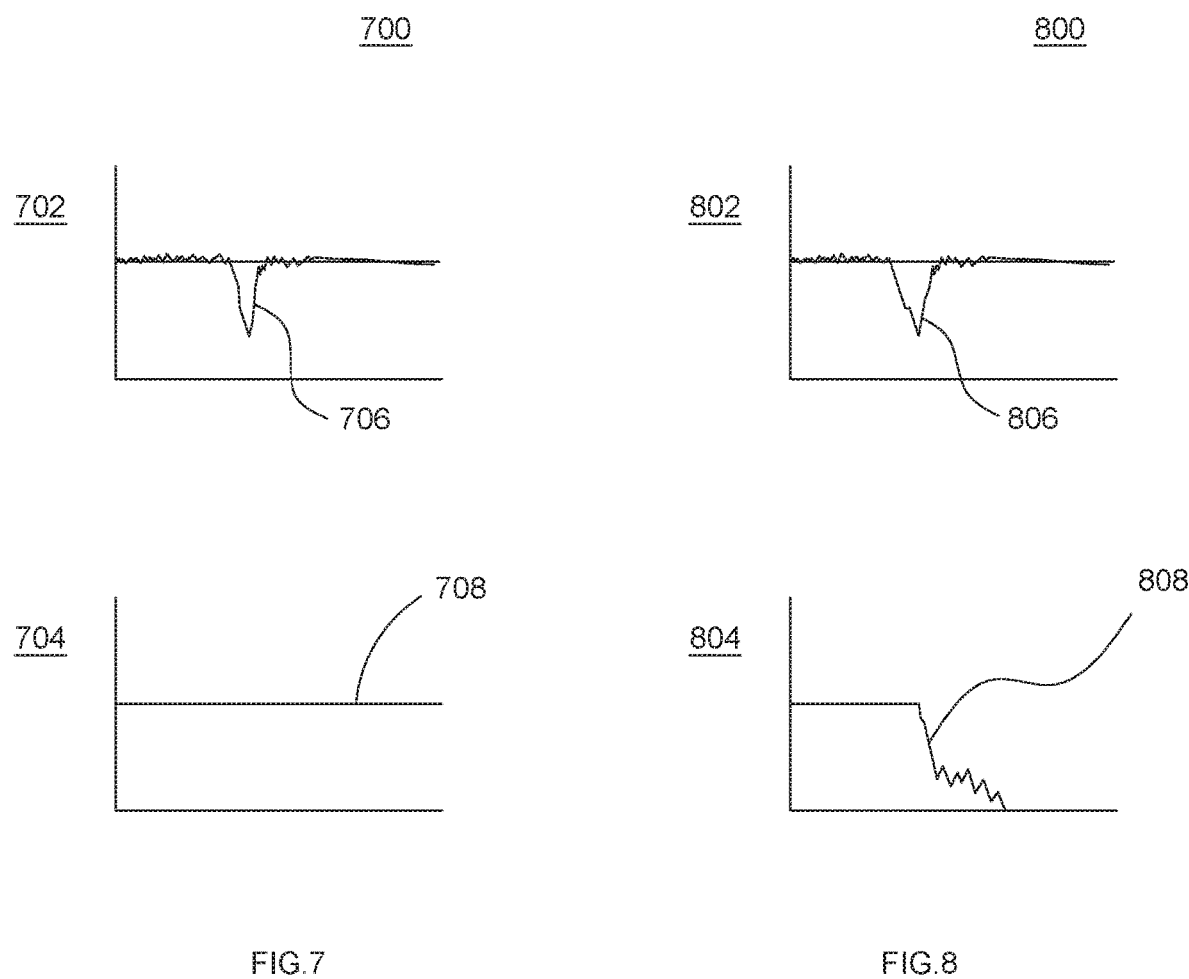
FIG. 7 is an event comparison showing an acceleration event detected by a phone that is not confirmed by a corresponding change in speed, in accordance with some embodiments.
FIG. 8 is an event comparison showing an acceleration event detected by a phone that is confirmed by a corresponding change in speed, in accordance with some embodiments.

FIG. 7 is a an event comparison 700 showing an acceleration event detected by a phone that is not confirmed by a corresponding change in speed, in accordance with some embodiments. More specifically, the output 702 of an internal accelerometer indicates a sudden change in acceleration in excursion 706. The output 702 is compared with the speed 704 of the vehicle, as indicated by the output of a satellite location receiver also in the phone device. However, magnitude 708 of the speed 704 indicates no change. Accordingly, there has likely been no collision experienced by the vehicle. Looking to the method of FIG. 4, then, this process is examined in steps 404 and 410.

However, the magnitude 708 of the speed 704 is positive, meaning the vehicle is in motion. If the magnitude 708 of the speed 704 were zero, or very low, then it may be indeterminate as to whether a collision occurred as the vehicle may be stationary after a collision as well as before. Thus, such a situation would be handled by the default setting that is processed in step 414 of FIG. 4.

FIG. 8 is an event comparison 800 showing an acceleration event detected by a phone that is confirmed by a corresponding change in speed, in accordance with some embodiments. Again, the output 802 of an internal accelerometer is compared with the magnitude 808 of the vehicle speed 806. Here, upon occurrence of an excursion 806 in the output 802 of the internal accelerometer, it can be seen that a substantial change in speed occurred as the magnitude 808 of the speed goes from a steady level, dropping quickly at the same time as the excursion 806, to be zero, or very low. This combination of events would be more likely indicative that the vehicle experienced a collision. Thus, in method 400, the processing would go from step 410 to step 408.

In some embodiments the phone device does not include an internal accelerometer. In such case, however, the phone device can communicatively link with an external accelerometer and follow a similar process of detecting an acceleration excursion and confirming it with another component to determine the likelihood that the detected acceleration excursion is the result of a collision. For example, while not all phone devices have an internal accelerometer, most modern phone devices have a satellite location receiver, and can therefore determine a speed at which the phone device is moving. Thus, an acceleration excursion detected at an external accelerometer can be compared with speed, similar to that of FIGS. 7-8, to determine whether a collision has likely occurred or not.

Figure 9:
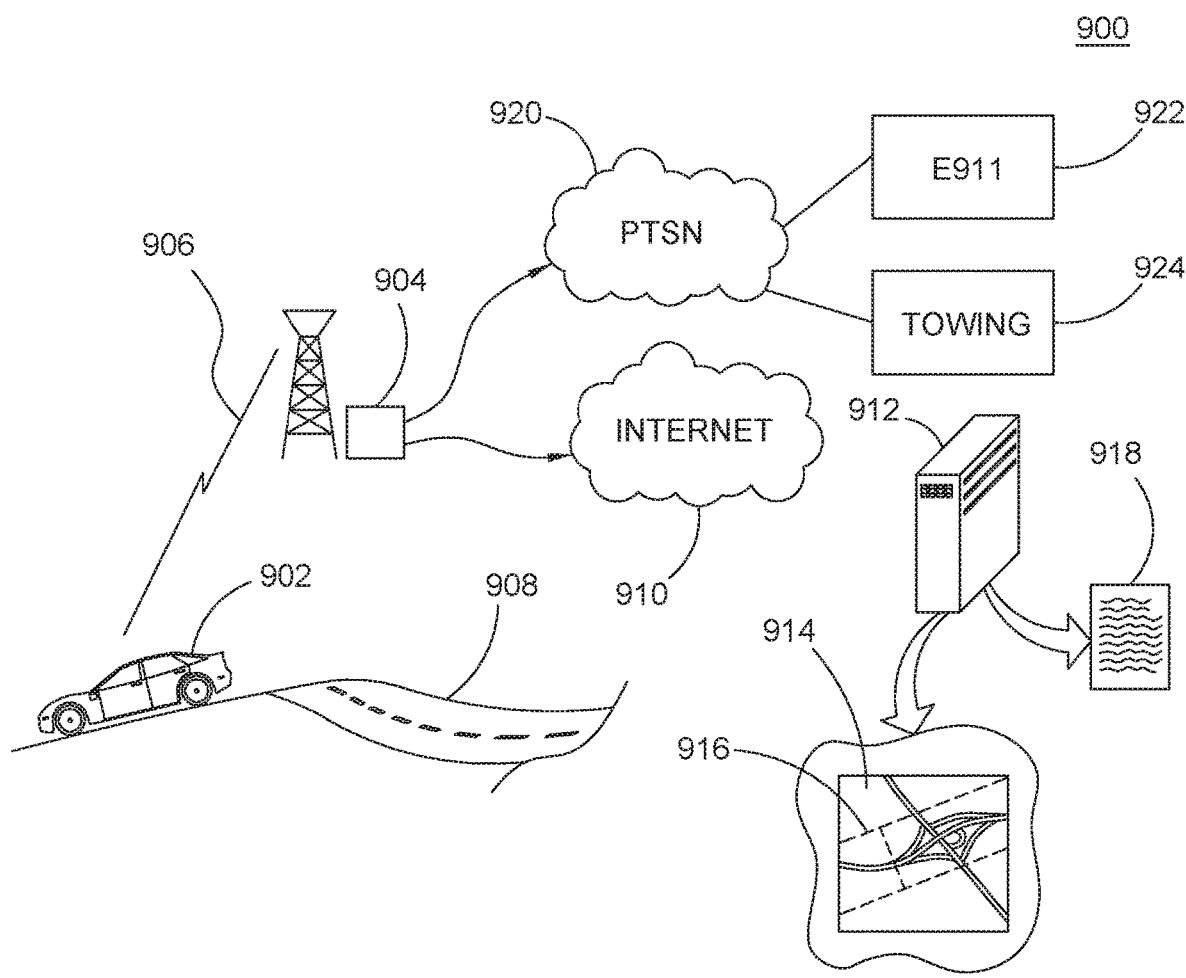
FIG. 9 is a system diagram of a system for assisting a user in the event of an accident or collision, in accordance with some embodiments.

FIG. 9 is a system diagram of a system 900 for assisting a user in the event of an accident or collision, in accordance with some embodiments. A user can be a passenger or driver in a vehicle 902 that has experienced a collision. The user has a phone device that operates in accordance with the teachings of the previous examples herein. The phone device can be used to connect to a cellular base station 904 using a cellular communication link 906. Upon determining that a collision has occurred by, for example, performing methods 300, 400, the phone device can prompt the user as to whether the user needs assistance. In some embodiments the phone device can automatically call an emergency services number to be connected with an emergency dispatch operator 922 using a public switched telephone network 920. For example, if the user does not respond to a voice prompt, or if the user responds in the affirmative to needing emergency assistance, the phone device can then call the emergency service dispatch 922. In cases where the collision is less severe, the user can alternatively have the phone device call some other service for assistance, such as, for example, a towing service 924.

The phone device can acquire information regarding nearby service providers from a traffic map service 912 using a data communication session via the internet 910. The traffic map service 912 maintains a map or maps 914 that can be divided into one or more geo-fenced regions 916. For each geo-fenced region 916 the server 912 can have a corresponding services list 918 that indicates the phone numbers of various entities in the geo-fenced region. Thus, when the phone device contacts the server 912, it can indicate its location using either geo-coordinates or a nearby road 908 designator. The server 912 can then determine which geo-fenced region 916 the vehicle 902 is in, and transmit the contact information for various services that may be of interest of assistance. Those numbers can then be used by the phone device to contact the entities associated with the number(s), at the direction of the user.

Figure 10:
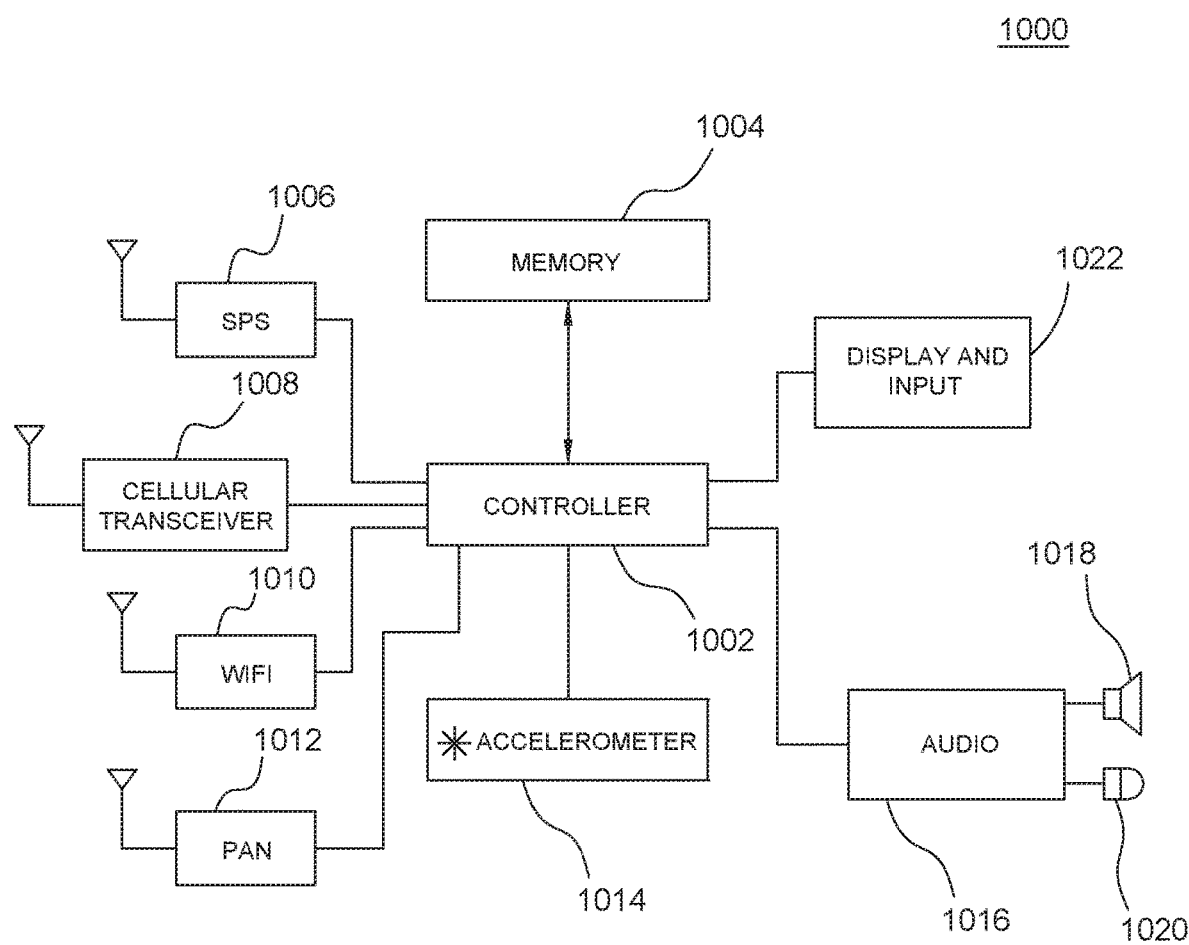
FIG. 10 shows a block schematic diagram of a phone device 1000 that can be configured to detect and respond to experiencing a vehicular collision, in accordance with some embodiments Those skilled in the field of the present disclosure will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

FIG. 10 shows a block schematic diagram of a phone device 1000 that can be configured to detect and respond to experiencing a vehicular collision, in accordance with some embodiments. The phone device 1000 includes a controller 1002 that comprises a processor and associated logic and other circuitry. The controller 1002 performs instruction code that can be stored in a memory 1004. As used here, the memory 1004 represents an aggregate of various forms of memory that can be interfaced with the controller 1002, including read only memory (ROM), random access memory (RAM), flash memory, etc. The memory 1004 therefore is circuitry that can include active and passive circuits, active circuits being those whose state can be changed (e.g. "1" to "0"), and passive circuits being those whose state is fixed (e.g. "1" or "0"). Some forms of memory are "non-volatile," meaning information encoded in them persists when there is no power applied to the memory. Instruction code is provided in the memory 1004 and is designed to cause the phone device to carry out the functionality described herein.

The controller 1002 is further interface with several radio receiver/transceiver circuits, including a satellite positioning system receiver 1006, a cellular transceiver 1008, and local area networking ("WiFi") transceiver 1010, and a personal area network transceiver 1012 (e.g. BLUETOOTH). The satellite positioning system (SPS) receiver 1006 can be substantially the same as that described in FIG. 1 as satellite positioning receiver 108. The cellular transceiver 1008 can operate using both voice and data channels of the air interface of a cellular telephony/communications system, as is well known. Each of these sub-systems 1006-1012 include the requisite circuitry for filtering, amplification, demodulation, modulation, encryption/decryption, and so on, and can receive data to be transmitted from the controller 1002, and provide data that has been received to the controller 1002. In particular, the PAN transceiver 1012, as well as the local area transceiver 1010, allow the phone device to connect with other, nearby device, such as, for example, an external accelerometer that can is located in a vehicle.

The controller 1002 is also coupled or interfaced with an internal accelerometer 1014 that indicates acceleration in a plurality of orthogonal axes. The internal accelerometer 1014 can include a memory that stores recent acceleration measurements of all of the axes. Alternatively, the internal accelerometer 1014 can provide an output of acceleration upon being queried or otherwise signaled by the controller 1002. In some embodiments the internal accelerometer can further be provided with an acceleration magnitude value that represents a threshold for initiating a determination as to whether a collision has occurred. The acceleration magnitude value can be stored in the internal accelerometer 1014, and if the total acceleration magnitude exceeds the acceleration magnitude value the internal accelerometer 1014 can signal the controller (e.g. using an interrupt), and upon receiving the signal, the controller 1002 can then commence performing instruction code to determine whether a collision has occurred, as indicated, for example, in method 400.

The phone device 1000 further includes an audio processor 1016 which can produce an analog electric signal, from a digital audio data source, that is provided to one or more speakers 1018 (e.g. a loudspeaker, an earpiece, etc.). A microphone 1020 is used to convert acoustic signals to electric audio signals, and the audio processor 1016 can further convert the electric audio signals to digital audio signals that can be, for example, transmitted via the cellular transceiver 1008. In some embodiments there can be a direct connection between the audio processor 1016 and the cellular transceiver 1008 for voice calling.

The phone device 1000 further includes a display and input system 1022. Most present day phone devices include a graphic display that is capable of sensing touch input. Furthermore, there can be buttons or switches that are used to, for example, adjust audio volume, turn the phone device on and off, and so on.

The inventive embodiments of the disclosure provide a phone device or equivalent mobile computing device to determine whether a vehicle in which the device is located has experienced an accident or collision, and in response to a determination that a collision has likely occurred, the device can prompt the user to facilitate the user in seeking appropriate assistance. Based on the location of the vehicle, the phone device is able to contact nearby entities that can provide assistance based on assigning particular entities to geo-fenced regions. Thus, the phone device can commence initiating communication with a nearby service provider who has been assigned to the geo-fenced region in which the vehicle is located. The user of the phone does not need to look up what service providers are in the region, which can be difficult.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, as well as in derivative documents such as non-provisional conversions, continuations, divisionals, and continuations in part, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as computer program product in a non-transient computer-readable storage medium having computer readable code stored thereon for programming a computer (e.g., comprising a processor) that is configured to perform a method as described and claimed herein. More particularly, the computer program product can contain instruction code that configures a phone device to carry out various functions described herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description as part of the original disclosure, and remain so even if cancelled from the claims during prosecution of the application, with each claim standing on its own as a separately claimed subject matter. Furthermore, subject matter not shown should not be assumed to be necessarily present, and that in some instances it may become necessary to define the claims by use of negative limitations, which are supported herein by merely not showing the subject matter disclaimed in such negative limitations.

We claim:

1. A method for detecting and responding to a collision incident by a phone device, comprising:
    monitoring an acceleration of a vehicle in which the phone device is located as indicated by an output of at least one accelerometer, comprising monitoring an internal acceleration sensor of the phone device and an external acceleration sensor to which the phone device is communicatively linked, and comparing the output of the internal acceleration sensor and the external acceleration sensor;
    detecting, in an output of the at least one accelerometer, an acceleration event indicative of a collision event being experienced by the vehicle;
    responsive to the acceleration event, the phone device automatically issuing a voice prompt to elicit a response from a vehicle occupant;
    when no voice response is received within a preselected time frame, the phone device automatically calling an emergency services number and issuing a pre-recorded message indicating a collision has occurred, and further issuing location information to an emergency services call center;
    when a voice response is received, the phone device performing an action corresponding to the voice response; and
    the phone device displaying a menu of additional optional actions that can be taken, wherein at least one of the additional optional actions is based on a location of the collision event.

2. The method of claim 1, wherein performing the action corresponding to the voice response comprises automatically calling the emergency services number and issuing a pre-recorded message indicating a collision has occurred, and further issuing location information to the emergency services call center.

3. The method of claim 1, wherein the at least one of the additional options that is based on a location of the collision event is determined by a geo-fenced region.

4. The method of claim 3, wherein automatically calling the emergency services number comprises calling an emergency services number corresponding to the geo-fenced region, wherein the emergency services number is received from a remote server.

5. The method of claim 1, further comprising the phone device, in response to automatically calling the emergency services number, connecting to an emergency responder.

6. The method of claim 1, further comprising publishing the location information in a traffic map server that allows the phone device to access a traffic map.

7. The method of claim 1, further comprising the phone device, in response to automatically calling the emergency services number, the phone device communicating an indication of a severity of the collision.

8. The method of claim 1, further comprising:
    in response to detecting the acceleration event, determining that a communication system of the vehicle is damaged; and
    in response to determining that the communication system of the vehicle is damaged, the phone device automatically calling a pre-programmed number to report a location of the vehicle.

9. A computer program product including a non-transient memory on which instruction code is stored, the instruction code being configured to control a phone device having a controller, an internal accelerometer, and a personal area network transceiver, wherein upon being performed by the controller, the instruction code configures the phone device to:
    monitor an output of the internal accelerometer to determine whether the phone device has experienced an acceleration greater than a preselected acceleration threshold;
    confirm, in response to the acceleration being greater than a preselected acceleration threshold, with an external source, that a corresponding change in acceleration was experienced by a vehicle in which the phone device is located;
    issue a voice prompt over a loudspeaker in response to acceleration being confirmed by the external source; and
    either call an emergency services number if no voice response is received within a preselected time period after the voice prompt, or perform an action that corresponds to a voice response received at the phone device within the preselected time period including determine a location of the phone device, determine a defined geo-fenced region in which the location of the phone device is located, and display a list of services associated with service providers associated with the geo-fenced region.

10. The computer program product of claim 9, wherein the instruction code that configures the phone device to confirm with the external source comprises instruction code that configures the phone device to communicate with an external accelerometer to determine if the external accelerometer experienced a corresponding change in acceleration.

11. The computer program product of claim 9, wherein the instruction code that configures the phone device to confirm with the external source comprises instruction code that configures the phone device to determine a difference between a first speed prior to the acceleration change and a second speed after the acceleration change, wherein the speed is indicated by an output of a satellite positioning receiver in the phone device.

12. The computer program product of claim 9, wherein the instruction code that configures the phone device to perform the action that corresponds to the voice response comprises instruction code that configures the phone device to call the emergency services number and issue a prerecorded message indicating that a collision has occurred.

13. The computer program product of claim 9, wherein the instruction code that configures the phone device to all the emergency services number comprises instruction code that configures the phone device to further communicate an indication of a severity of a collision which caused the change in acceleration.

14. A method for responding to a detecting and responding to a collision by a phone device, comprising:
the phone device detecting, at an internal accelerometer, a change in acceleration that exceeds a preselected acceleration threshold;
upon detecting the change in acceleration, the phone device confirming, by communicating with an external accelerometer, to determine if a corresponding change in acceleration was experienced by the external accelerometer, wherein the external accelerometer is located in a vehicle in which the phone device is located; and
in response to confirming the corresponding change in acceleration, the phone device automatically performing one of a plurality of assistance actions.

15. The method of claim 14, wherein confirming with the external source comprises determining, by a satellite positioning system receiver in the phone device that is configured to receive and decode satellite positioning signals received from positioning satellites, a first speed prior to the change in acceleration, and a second speed after the change in acceleration, and a difference between the first speed and the second speed.

16. The method of claim 14, wherein automatically performing one of a plurality of assistance actions comprises:
issuing a voice prompt; and
when no voice response is received within a preselected time period, the phone device automatically calling an emergency services number.

17. The method of claim 14, wherein automatically performing one of a plurality of assistance actions comprises:
issuing a voice prompt;
receiving a voice response within a preselected time period; and
performing an action corresponding to the voice response.

* * * * *